United States Patent [19]

Blodgett

[11] Patent Number: 5,311,155
[45] Date of Patent: May 10, 1994

[54] METHOD AND APPARATUS FOR IMPARTING A LINEAR FREQUENCY RESPONSE TO A SIGNAL

[75] Inventor: James R. Blodgett, Derry, N.H.

[73] Assignee: AT&T Bell Laboratories, Murray Hill, N.J.

[21] Appl. No.: 59,798

[22] Filed: May 10, 1993

[51] Int. Cl.$^5$ .................... H03H 7/03; H03H 7/18
[52] U.S. Cl. ................... 333/28 R; 333/156
[58] Field of Search .......... 333/28 R, 138, 156, 333/160, 161

[56] References Cited

U.S. PATENT DOCUMENTS

| | | | |
|---|---|---|---|
| 3,551,854 | 12/1970 | Endo et al. | 333/28 R |
| 5,109,793 | 5/1991 | McNab | 333/156 |
| 5,223,808 | 6/1993 | Lee et al. | 333/161 X |

OTHER PUBLICATIONS

"Slope Compensating PIN Diode Attenuator", by David C. Kim, *Microwave Journal*, Mar. 1986, p. 181.
"Procedure Yields Effective Matched Slope-Equalizer Design" by John H. Weidman, *Microwave System News*, Jul. 1986, pp. 107-115.

*Primary Examiner*—Paul Gensler
*Attorney, Agent, or Firm*—Jason P. DeMont

[57] ABSTRACT

A method and apparatus are disclosed for imparting a linear, but sloped, frequency response signal to a narrowband signal having a sinusoidal component at $\omega_0$ radians per second. An illustrative embodiment comprises: a first signal divider, a first signal combiner and three signal paths between them. The first signal path advantageously comprises a first bi-phase attenuator; the second signal path advantageously comprises a first delay element; and the third signal path advantageously comprises both a second bi-phase attenuator and a second delay element. The first delay element preferably makes the second signal path substantially close to $$\frac{2N + 1}{8\pi\omega_0}$$

seconds longer than the first signal path, where N is an integer. The second delay element preferably makes the third signal path substantially close to $$\frac{2N + 1}{4\pi\omega_0}$$

seconds longer than the first signal path.

8 Claims, 5 Drawing Sheets

5,311,155

METHOD AND APPARATUS FOR IMPARTING A LINEAR FREQUENCY RESPONSE TO A SIGNAL

FIELD OF THE INVENTION

The present invention relates to electric circuit design in general, and more particularly, to methods and apparatus which have a sloped frequency response.

BACKGROUND OF THE INVENTION

Many electric circuits have the adverse side effect of having a sloped frequency response such that the circuits attenuate, or amplify, signals having one frequency more, or less, than signals having a different frequency (often represented by a Bode plot with a linear frequency response curve having a non-zero slope).

SUMMARY OF THE INVENTION

Embodiments of the present invention are capable of imparting a sloped linear frequency response to a signal while avoiding many of the costs and restrictions associated with prior methods. Specifically, embodiments of the present invention can be used in conjunction with utile circuits to correct the sloped frequency response characteristic of the utile circuit. Furthermore, embodiments of the present invention need not change the nominal phase, the center band amplitude or the group delay of the signal.

These results are obtained in an illustrative embodiment of the present invention that comprises a first signal divider, a first signal combiner and three signal paths between them. The first signal path advantageously comprises a first bi-phase attenuator, the second signal path advantageously comprises a first delay element, and the third signal path advantageously comprises both a second bi-phase attenuator and a second delay element. The first delay element preferably makes the second signal path substantially close to $$\frac{2N+1}{8\pi\omega_0}$$

seconds longer than the first signal path, where N is an integer and $\omega_0$ is the frequency of a sinusoidal component in the narrowband signal input to the embodiment. The second delay element preferably makes the third signal path substantially close to $$\frac{2N+1}{4\pi\omega_0}$$

seconds longer than the first signal path.

DETAILED DESCRIPTION

Figure 1:
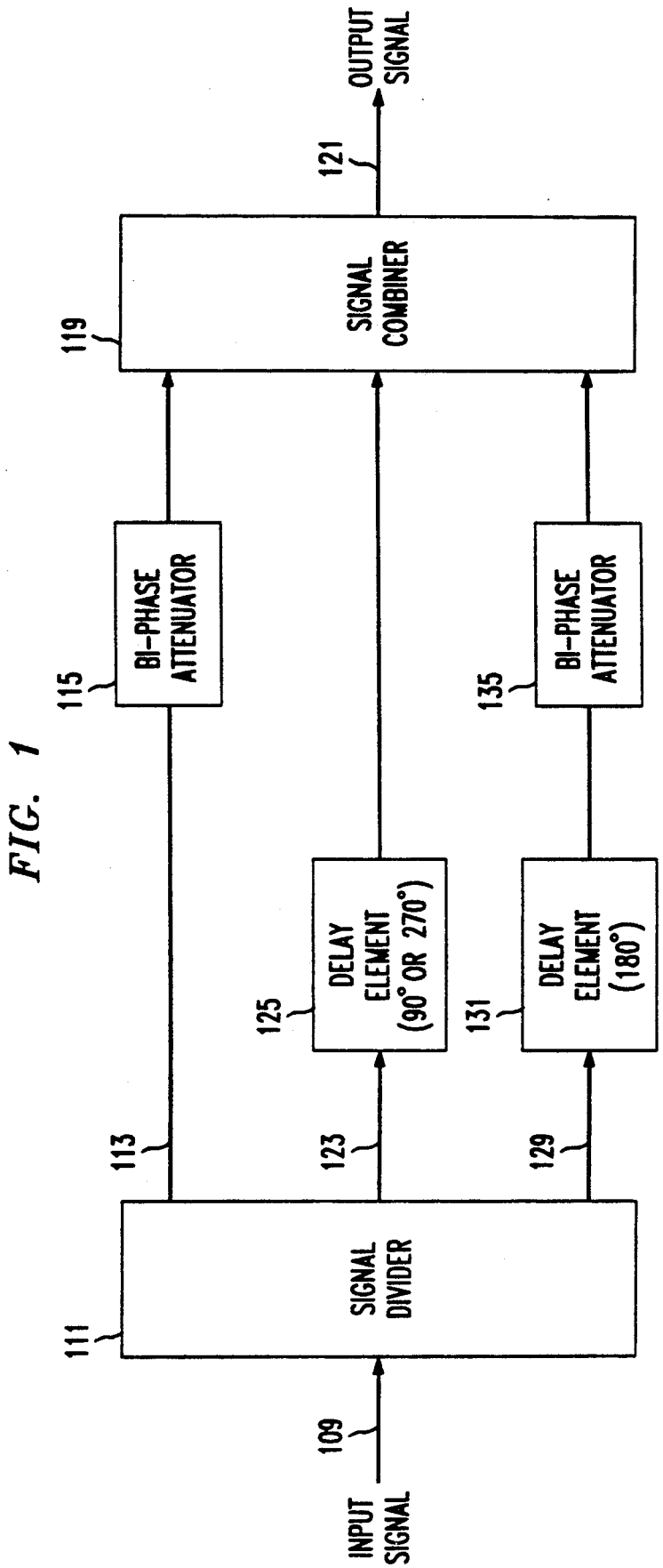
FIG. 1 shows a block diagram of an illustrative embodiment of the present invention.

FIG. 1 shows a block diagram of an illustrative embodiment of the present invention that advantageously comprises signal divider 111, signal combiner 129, delay element 125, delay element 131, bi-phase attenuator 115 and bi-phase attenuator 135.

Signal divider 111 preferably receives, from lead 109, a narrowband input signal comprising: (1) a sinusoidal component at $\omega_0$ radians per second, (2) an RMS amplitude (hereinafter "amplitude"), and (3) a phase. Signal divider 111 preferably creates a first signal on signal path 113, a second signal on signal path 123 and a third signal on signal path 129 such that all three signals are analog representations of the input signal. While it is preferred that the first signal, the second signal and the third signal be created with equal amplitude and phase by signal divider 111, it will be clear to those skilled in the art how to make and use embodiments of the present invention in which the first, second and/or third signals are not created with equal amplitude or phase. Furthermore, it will be clear to those skilled in the art that signal divider 111 can be easily fabricated (using e.g., a Wilkinson power divider, a hybrid coupler, etc.) or purchased commercially. See E. J. Wilkinson, "An N Way Hybrid Power Divider," *IRE Trans.*, MTT-8, 116–118 (January 1960); and J. Lange, "Integrated Stripline Quadrature Hybrid," MTT-17, No. 12, 1150–1151 Dec. 1969). Likewise, it will be clear to those skilled in the art that signal divider 111 can be fabricated as two, one-to-two dividers as illustrated at 311 and 315 in FIG. 3.

Signal combiner 119 advantageously receives as input the first signal from signal path 113, the second signal from signal path 123 and the third signal from signal path 129, and preferably creates an output signal, on lead 121, based on the unweighted sum of the three input signals. While it is preferred that signal combiner 119 add the first signal, the second signal and the third signal in phase, it will be clear to those skilled in the art how to make and use embodiments of the present invention in which the respective input signals are disproportionately added and/or are not added in phase. Furthermore, it will be clear to those skilled in the art that signal combiner 119 can be easily fabricated (using e.g., a Wilkinson power divider, a hybrid coupler, etc.) or purchased commercially. See E. J. Wilkinson, "An N Way Hybrid Power Divider," *IRE Trans.*, MTT-8, 116–118 January 1960); and J. Lange, "Integrated Stripline Quadrature Hybrid," MTT-17, No. 12, 1150–1151 December 1969). Likewise, it will be clear to those skilled in the art that signal combiner 119 can be fabricated as two, two-to-one signal combiners, as illustrated at 319 and 327 in FIG. 3.

Delay element 125 is preferably a length of conducting material (e.g., coaxial cable, a section of strip line, a microstrip, a lumped delay line, etc.) lying in signal path 123 that causes signal path 123 to be substantially close to $$\frac{2N+1}{8\pi\omega_0}$$

seconds longer than signal path 113, where N is an integer. The purpose of delay element 125 is to impart a group delay to the second signal on signal path 123 such that the phase of the sinusoidal component on signal path 123 is shifted by either 90° or 270° (depending on whether a positive frequency response slope or a negative frequency response slope is desired) relative to the phase of the sinusoidal component on signal path 113. Given the purpose of delay element 125, it will be clear to those skilled in the art that delay element 125 can be subsumed within signal divider 111. Likewise, it will be clear to those skilled in the art that delay element 125 can be subsumed into signal combiner 119.

Delay element 131 is preferably a length of conducting material (e.g., coaxial cable, a section of strip line, a microstrip, a lumped delay line, etc.) lying in signal path 129 that causes signal path 129 to be substantially close to $$\frac{2N+1}{4\pi\omega_0}$$

seconds longer than signal path 113, where N is an integer. The purpose of delay element 131 is to impart a group delay to the third signal on signal path 129 such that the phase of the sinusoidal component on signal path 129 is shifted by 180° relative to the phase of the sinusoidal component on signal path 113. Given the purpose of delay element 131, it will be clear to those skilled in the art that delay element 131 can be subsumed within signal divider 111. Likewise, it will be clear to those skilled in the art that delay element 131 can be subsumed into signal combiner 119.

A first signal control block, such as bi-phase attenuator 115, lies in signal path 113 and advantageously multiplies a signal placed on its input by a factor denoted $G_1$. A second signal control block, such as bi-phase attenuator 135, lies in signal path 129 and advantageously multiplies a signal placed on its input by a factor denoted $G_2$. The factor $G_1$ preferably is within the range $-1 \leq G_1 \leq +1$, and the factor $G_2$ is preferably within the range $-1 \leq G_2 \leq +1$. Bi-phase attenuator 115 and bi-phase attenuator 135 are preferably identical (i.e., non-reflective matched impedance on both ports on all settings) with $G_1 = G_2$. It will be clear to those skilled in the art that $G_1$ and $G_2$ can be set so as to impart any linear frequency response to the input signal on lead 109.

It is preferred that the phases of bi-phase attenuator 115 and bi-phase attenuator 135 be equal although it will be clear to those skilled in the art how to make and use embodiments of the present invention in which they are not. It will be clear to those skilled in the art that bi-phase attenuator 115 and bi-phase attenuator 135 can be easily fabricated or purchased commercially. Furthermore, it will be clear to those skilled in the art that either or both of bi-phase attenuator 115 and bi-phase attenuator 135 can be subsumed into signal divider 111 or signal combiner 119.

Figure 2:
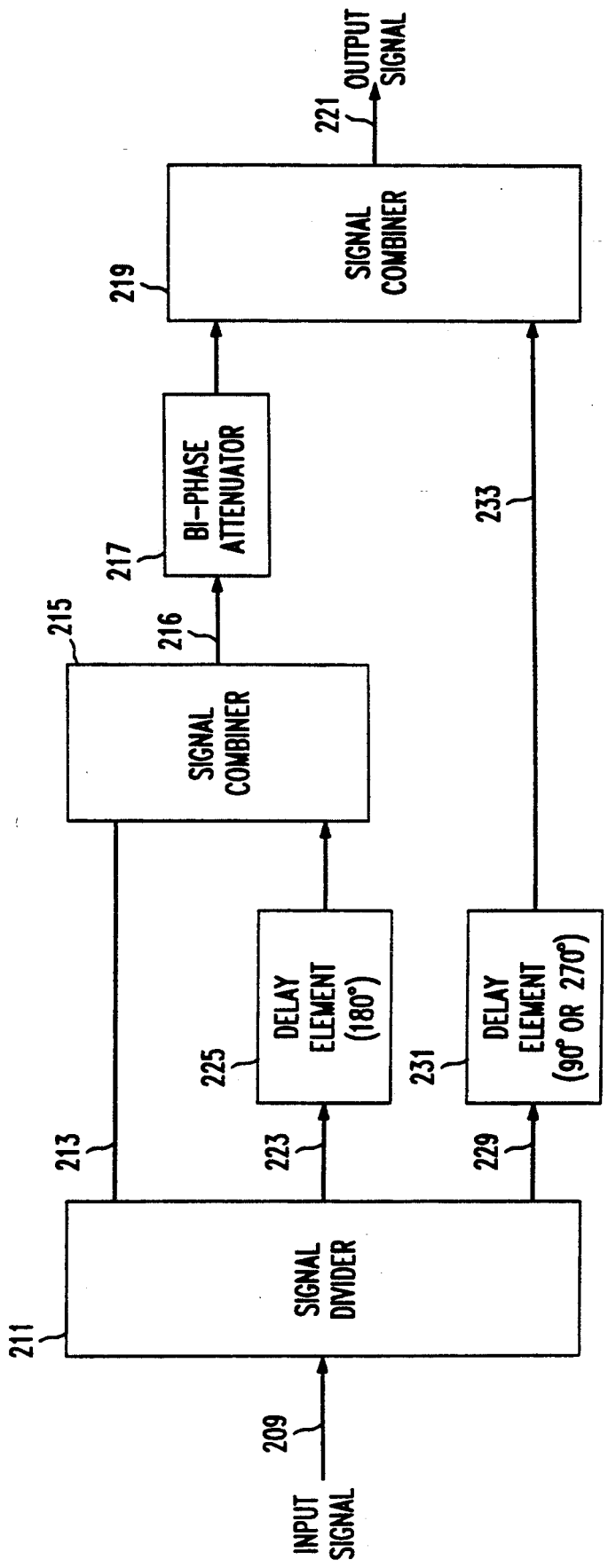
FIG. 2 shows a block diagram of another illustrative embodiment of the present invention.
Figure 3:
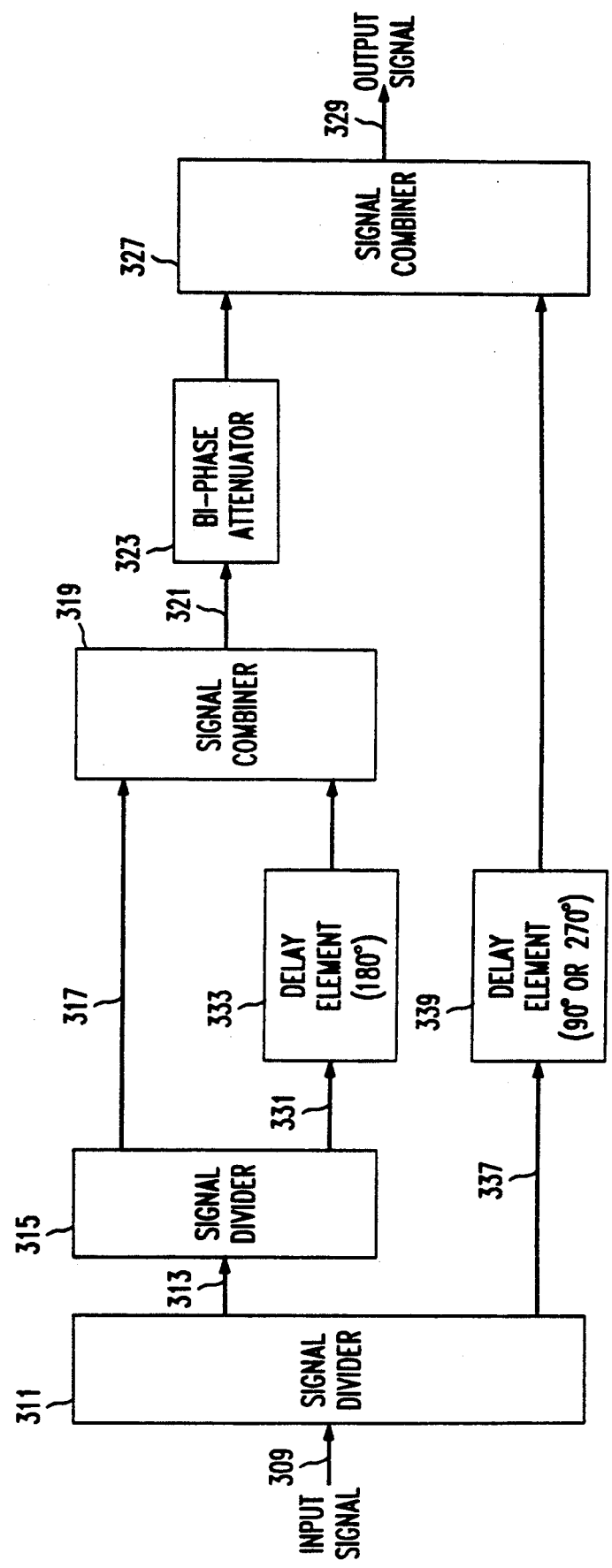
FIG. 3 shows a block diagram of yet another illustrative embodiment of the present invention.

Block diagrams portraying other illustrative embodiments of the present invention are shown in FIG. 2 and FIG. 3. It will be clear to those skilled in the art how to make and use embodiments of the present invention in accordance with FIG. 2 and FIG. 3 from the same components described for the embodiment of FIG. 1.

Figure 4:
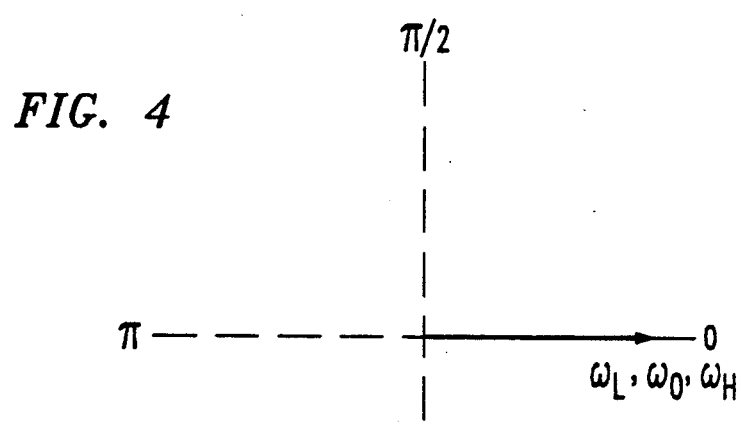
FIG. 4 shows a phase diagram of a typical signal on lead 109 of the illustrative embodiment shown in FIG. 1.

FIG. 4, FIG. 5, FIG. 6, FIG. 7 and FIG. 8 are phase diagrams which, in toto, graphically illustrate how the illustrative embodiment of FIG. 1 operates when $G_1 = 1$ and $G_2 = 1$ and delay element 125 is set for 90°. FIG. 4 shows a narrowband signal, on lead 109, which comprises three sinusoidal components, $\omega_L$, $\omega_0$, $\omega_H$, all illustratively of the same amplitude and identical phase. $\omega_L$ is of a lower frequency that $\omega_0$ and $\omega_0$ is of a lower frequency than $\omega_H$.

Figure 5:
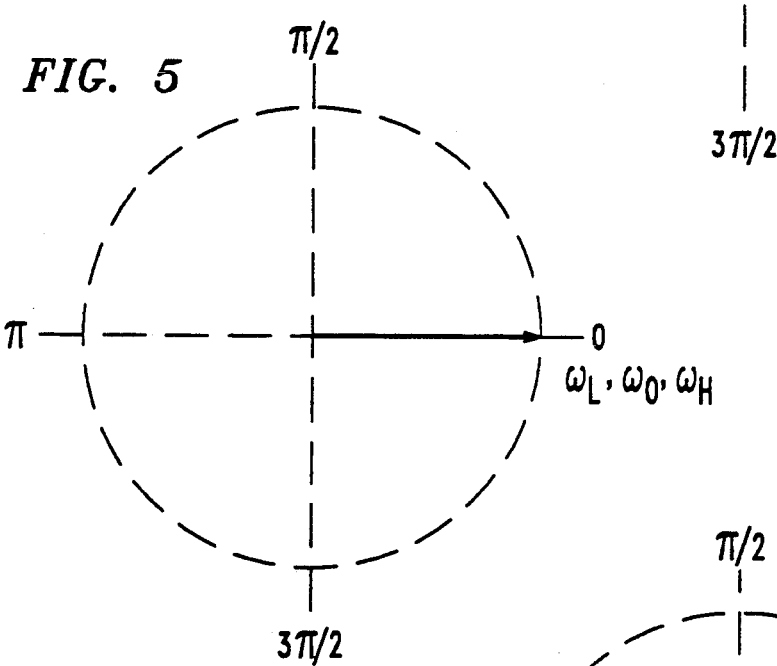
FIG. 5 shows a phase diagram of a typical signal on signal path 113, upon entering signal combiner 119, of the illustrative embodiment shown in FIG. 1.

FIG. 5 illustrates the phase and magnitude relationship of $\omega_L$, $\omega_0$, and $\omega_H$ on signal path 113, upon entering signal combiner 119, with respect to the magnitude and phase of the signals on signal path 123 and signal path 129.

Figure 6:
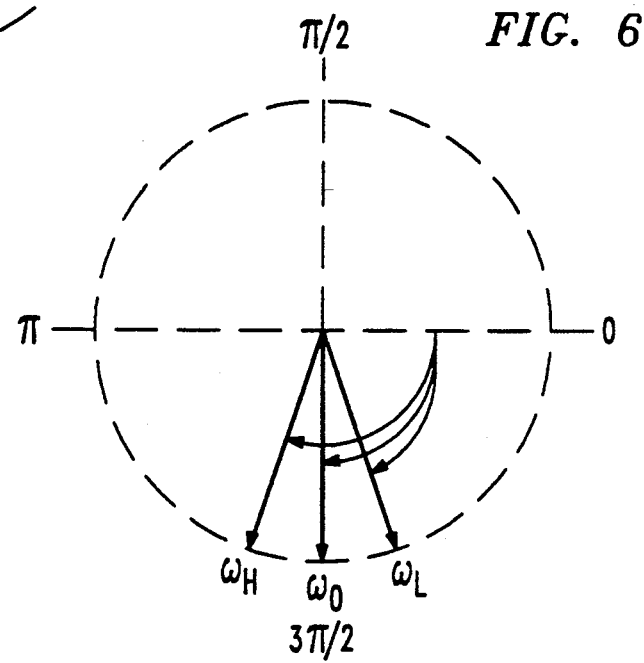
FIG. 6 shows a phase diagram of a typical signal on signal path 123, upon entering signal combiner 119, of the illustrative embodiment shown in FIG. 1.

FIG. 6 illustrates the phase and magnitude relationship of $\omega_L$, $\omega_0$, and $\omega_H$ on signal path 123, upon entering signal combiner 119, with respect to the magnitude and phase of the signals on signal path 113 and signal path 129. While the magnitude of $\omega_L$, $\omega_0$, and $\omega_H$ upon entering signal combiner 119 are the same, the phases are different due to the group delay in the signal path 123 (including delay element 125).

Figure 7:
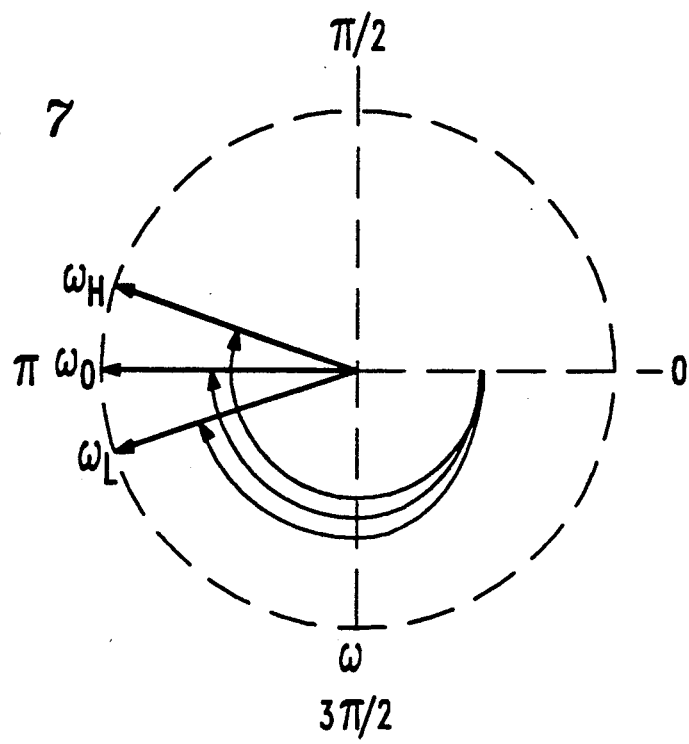
FIG. 7 shows a phase diagram of a typical signal on signal path 129, upon entering signal combiner 119, of the illustrative embodiment shown in FIG. 1.

FIG. 7 illustrates the phase and magnitude relationship of $\omega_L$, $\omega_0$, and $\omega_H$ on signal path 129, upon entering signal combiner 119, with respect to the magnitude and phase of the signals on signal path 113 and signal path 123. While the magnitude of $\omega_L$, $\omega_0$, and $\omega_H$ upon entering signal combiner 119 are the same, the phases are different due to the group delay in signal path 123 (including delay element 131).

Figure 8:
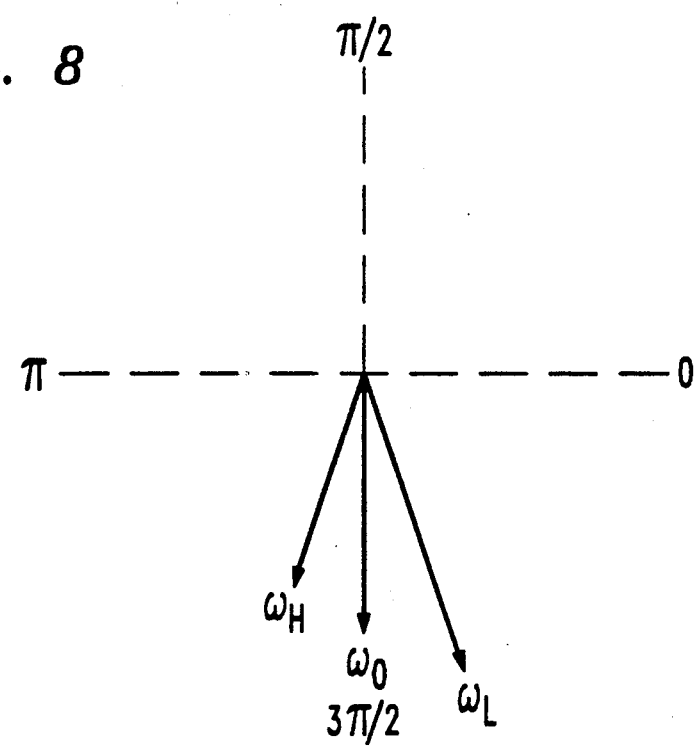
FIG. 8 shows a phase diagram of a typical signal on lead 121 of the illustrative embodiment shown in FIG. 1.

FIG. 8 illustrates the phase and magnitude relationship of $\omega_L$, $\omega_0$, and $\omega_H$ on lead 121 after signal combiner 119 has added the three signals.

I claim:

1. An apparatus for processing an input signal comprising a sinusoidal component at $\omega_0$ radians per second, said apparatus comprising:
    a signal divider (111) for creating a first signal based on said input signal, for putting said first signal onto a first signal path (113), for creating a second signal based on said input signal, for putting said second signal onto a second signal path (123), for creating a third signal based on said input signal, and for putting said third signal onto a third signal path (129);
    a signal combiner (119) for receiving said first signal from said first signal path (113), said second signal from said second signal path (123), and said third signal from said third signal path (129), and for creating an output signal based on the sum of said first signal, said second signal, and said third signal;
    a first delay element (125) in said second signal path (123) for making said second signal path (123) substantially close to $$\frac{2N+1}{8\pi\omega_0}$$

seconds longer than said first signal path (113), where N is an integer; and
    a second delay element (131) in said third signal path (129) for making said third signal path (129) substantially close to $$\frac{2N+1}{4\pi\omega_0}$$

seconds longer than said first signal path (113).

2. The apparatus of claim 1 further comprising:
a first signal control block (115) in said first signal path (113) for modifying said first signal; and
a second signal control block (135) in said third signal path (129) for modifying said third signal.

3. The apparatus of claim 2 wherein said first signal control block (115) comprises a first bi-phase attenuator, and said second signal control block (135) comprises a second bi-phase attenuator.

4. A method for processing an input signal comprising a sinusoidal component at $\omega_0$ radians per second, said method comprising the steps of:
dividing said input signal into a first signal based on said input signal, a second signal based on said input signal, and a third signal based on said input signal;
putting said first signal onto a first signal path;
putting said second signal onto a second signal path;
putting said third signal onto a third signal path;
delaying said second signal with a first delay element in said second signal path such that said signal path is substantially close to $$\frac{2N+1}{8\pi\omega_0}$$

seconds longer than said first signal path, where N is an integer;
delaying said third signal with a second delay element in said third signal path such that said third signal for substantially close to $$\frac{2N+1}{4\pi\omega_0}$$

seconds longer than said first signal path;
receiving, with a signal combiner, said first signal from said first signal path, said second signal from said second signal path and said third signal from said third signal path; and
combining, with said signal combiner, said first signal, said second signal and said third signal to create an output signal.

5. The method of claim 4 further comprising the step of attenuating said first signal with a gain control block.

6. An apparatus for processing an input signal comprising a sinusoidal component at $\omega_0$ radians per second, said apparatus comprising:
a first signal divider (311) for creating a first signal based on said input signal, for putting said first signal onto a first signal path (313), for creating a second signal based on said input signal, and for putting said second signal onto a second signal path (337);
a second signal divider (315) for creating a third signal based on said first signal, for putting said third signal onto a third signal path (317), for creating a fourth signal based on said first signal, and for putting said fourth signal onto a fourth signal path (331);
a first signal combiner for receiving said third signal from said third signal path (317) and said fourth signal from said fourth signal path (331), for creating a fifth signal based on said third signal and said fourth signal, and for putting said fifth signal onto a fifth signal path (321);
a first delay element (333) in said fourth signal path (331) for making said fourth signal path (331) substantially close to $$\frac{2N+1}{4\pi\omega_0}$$

seconds longer than said third signal path (317), where N is an integer;
a second delay element (339) in said second signal path (337) for making said second signal path (337) substantially close to $$\frac{2N+1}{8\pi\omega_0}$$

seconds longer than the sum of said first signal path (313), said third signal path (317) and said fifth signal path (321); and
a signal combiner (327) for receiving said fifth signal from said fifth signal path (321) and said second signal from said second signal path (337) for creating an output signal based on the sum of said fifth signal and said second signal.

7. The apparatus of claim 6 further comprising a signal control block (323) in said fifth signal path (321) for modifying said fifth signal.

8. The apparatus of claim 7 wherein said signal control block comprises a bi-phase attenuator.

* * * * *